US009898467B1

(12) United States Patent
Pitzel

(10) Patent No.: US 9,898,467 B1
(45) Date of Patent: Feb. 20, 2018

(54) SYSTEM FOR DATA NORMALIZATION

(71) Applicant: AMAZON TECHNOLOGIES, INC., Reno, NV (US)

(72) Inventor: Bradley John Pitzel, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 382 days.

(21) Appl. No.: 14/035,791

(22) Filed: Sep. 24, 2013

(51) Int. Cl.
G06F 17/30 (2006.01)

(52) U.S. Cl.
CPC ................. G06F 17/3007 (2013.01)

(58) Field of Classification Search
CPC .................................. G06F 17/3007
USPC ....................................... 707/694
See application file for complete search history.

(56) References Cited

U.S. PATENT DOCUMENTS

| 7,225,199 | B1* | 5/2007 | Green | G06F 17/2785 |
| 2002/0040359 | A1* | 4/2002 | Green | G06F 17/2785 |
| 2003/0050782 | A1* | 3/2003 | Zweig | G06F 17/27 |
| | | | | 704/270 |
| 2003/0126117 | A1* | 7/2003 | Megiddo | G06F 17/30864 |
| 2005/0108010 | A1* | 5/2005 | Frankel | G06F 17/27 |
| | | | | 704/235 |
| 2005/0108630 | A1* | 5/2005 | Wasson | G06F 17/241 |
| | | | | 715/230 |
| 2006/0167873 | A1* | 7/2006 | Degenaro | G06F 9/45512 |
| 2009/0070328 | A1* | 3/2009 | Loeser | G06F 17/30672 |
| 2009/0125805 | A1* | 5/2009 | Ananthanarayanan | G06F 17/2211 |
| | | | | 715/255 |
| 2009/0282035 | A1* | 11/2009 | Ferreira | G06F 17/241 |
| 2011/0035390 | A1* | 2/2011 | Whitehouse | H04L 63/1425 |
| | | | | 707/755 |
| 2012/0066578 | A1* | 3/2012 | Robin | G06F 3/03545 |
| | | | | 715/212 |
| 2013/0097134 | A1* | 4/2013 | Thompson | G06F 17/30911 |
| | | | | 707/696 |

* cited by examiner

Primary Examiner — Rehana Perveen
Assistant Examiner — Hicham Skhoun
(74) Attorney, Agent, or Firm — Lindauer Law, PLLC

(57) ABSTRACT

Described are techniques and systems to process input data into normalized data using regular expression ("regex") tokens to build rules. The regex tokens refer to a predefined regex phrase. A developer or an automated system may create the regex tokens. A user or automated system may combine and reuse the regex tokens in various ways to express different normalization rules. These rules may be automatically processed to generate regexs. The regexs are used in processing the input data to generate the normalized data.

20 Claims, 8 Drawing Sheets

SYSTEM FOR DATA NORMALIZATION

BACKGROUND

Many information processing systems use data which may be expressed in variable ways. For example, an online merchant may receive input data containing details about products for sale from different suppliers, with each supplier using a different value to represent the same size. These variations may introduce difficulties in using the input data.

Figure 1:
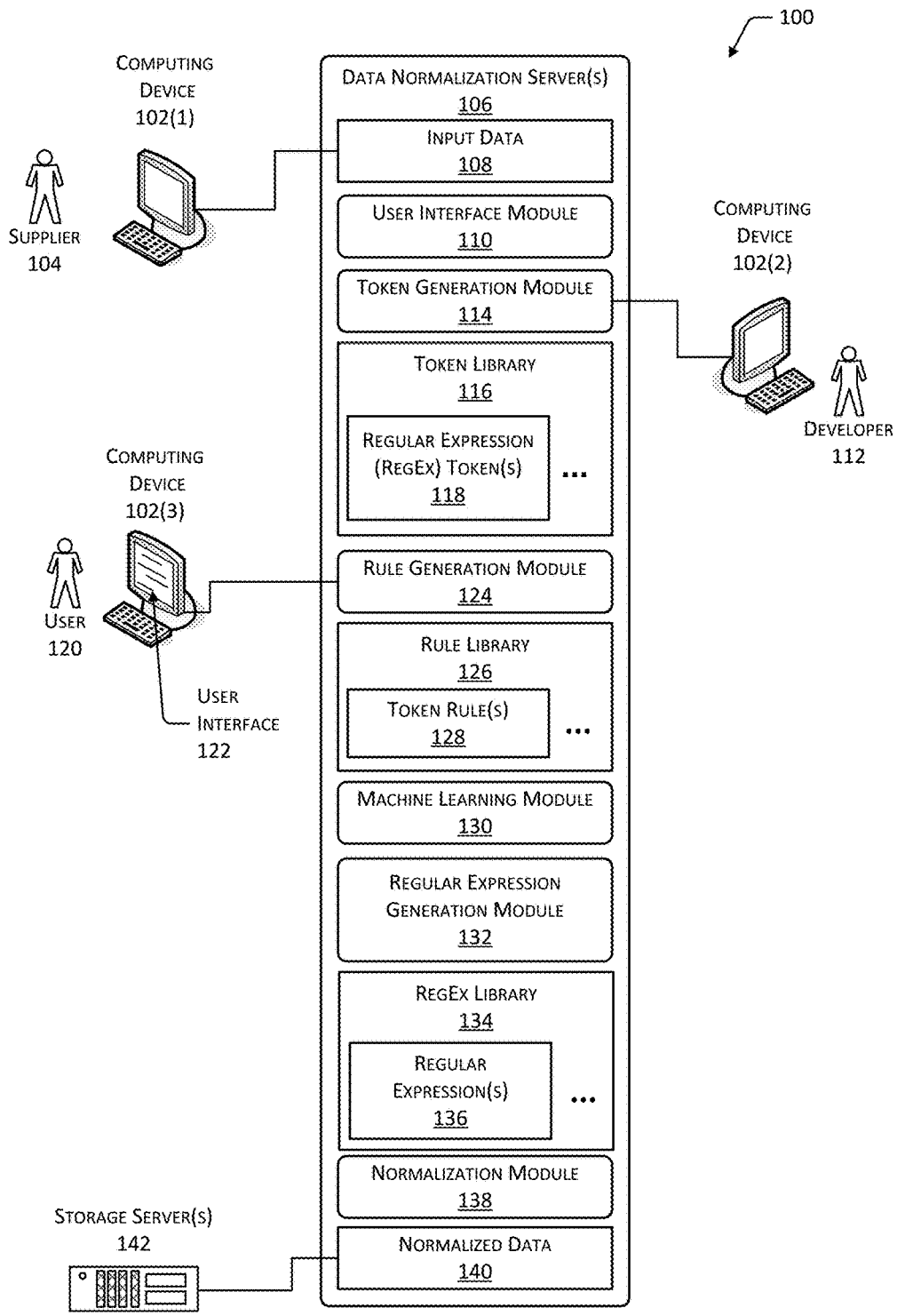
FIG. 1 is a system for data normalization using regular expression ("regex") tokens to build rules which are processed into regexs suitable for processing input data into normalized data.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Organizations may receive input data from outside sources. The information expressed in this input data may be variable, such that information which may be considered equivalent is expressed in many different ways. For example, a merchant may receive input data from a supplier which contains information about various items of apparel. The values which express sizing information may vary between suppliers, or even within the same supplier. For example, a single input data file containing information about women's shirts may have different shirts which are in the same size but have sizing information of "X-Small", "Womens X-Small", "XS", "Ladies Extra Small", "US XS (0-2)", "XSML", and so forth. This information may be human-readable in that a human would likely understand that these are equivalent sizes.

Data normalization techniques may be applied to modify or produce new data in which the data is expressed in a predefined way. For example, the sizing data may be normalized such that the strings "X-Small", "Womens X-Small", "XS", "Ladies Extra Small", "US XS (0-2)", "XSML", and so forth are represented by a normalized value such as "X-Small". Data normalization may allow for easier searching or integration of data, improving system operation, end-user experience, and so forth.

The data normalization process may be facilitated by using regular expressions. Regular expressions are a sequence of characters indicative of a search pattern. Regular expressions may include regular characters, metacharacters, or both. The regular characters are those which have their literal meaning, such as the regular characters "abc" represent the first three letters in the English alphabet. In comparison, metacharacters may comprise a function or a particular input value. For example, the sequence of metacharacters of "[abc]" may be processed by a normalization module to find any strings which match any one of the letters within the square brackets, such as "a", "b", or "c". The regular expression (or "regex") may be considered an expression which represents a particular set of strings. For data normalization purposes, regexs provide a powerful and compact way to represent may different strings. For example, rather than a large set of individual rules for each literal match (such as "Womens X-Small"="X-Small"), a single regular expression may be used. In this example, the regex to find these variations of small may be expressed as:

(?i)(.*)(?<![a-z])(X\s?|X\s*-\s*|Extra\s*|Extra\s*-\s*)
(small|sm\b|s\b)(.*)

Once generated, these regexs may be used to normalize the input data by searching for and replacing or otherwise modifying the information to the desired normalized value. Creation of a regex calls for information about the input data and equivalencies between the information present within. In traditional systems, a human software developer ("developer") manually coded regexs to normalize a particular piece of information in the input data. This is skill and labor intensive, and requires time which may delay intake of the input data.

Described herein are techniques and systems for data normalization in which regex tokens are used to formulate one or more token rules. The regex tokens are human-readable tags which are indicative of a previously generated regular expression phrase or snippet. For example, the regex token of "<xsmall>" may refer to the regex described above for the variations of extra small.

The regex tokens may be generated at least in part using one or more machine learning techniques. For example, a neural network may determine a set of strings which are equivalent to one another. From this equivalency, a regex phrase which is descriptive of the set may be generated. This regex phrase may then be represented as a regex token. In another implementation, the developer may manually generate the regex token.

A user other than the developer may create or modify the token rule which includes one or more regex tokens and a normalized value. For example, the token rule of "X-small, <xsmall>" allows the user to express the operation of finding the strings which match the set of strings defined by the regex phrase and replacing them with the normalized value "X-small". This is simpler and requires less training to use and maintain compared to having the user work directly with the regular expressions. Thus, the regex tokens and the token rules provide an abstraction layer which conceals the complexity of the underlying regex phrases from the user. As new variations are discovered in the input data, new token rules may be easily added, and existing token rules may be easily modified.

The token rule and use of the regex tokens may conform to a predefined syntax and grammar. For example, the grammar may require that a regex token may appear only once within a particular token rule. In another example, position of an attribute relative to a particular regex token may impart meaning. For example, the regex token "<range>" looking for strings which are indicative of a range of values ranging from five to six (such as "5/6", "5-6", "5 to 6", and so forth) may be expressed in the token rule with the syntax "5<range>6".

In some implementations the token rules may be generated at least in part using one or more machine learning techniques. For example, frequency analysis may be applied to the input data to detect patterns in a particular field of the input data and associate those patterns with particular regex tokens.

The token rules are processed, and complete regular expressions are generated. The complete regular expressions may include attribute values, ranges, normalized value(s), and so forth. The complete regex may then be used to process the input data into the normalized data. For example, the complete regexs may be used to find "XS" and replace with "X-small", providing normalized data which is easier to search or manipulate.

The techniques and systems described in this disclosure allow for simpler normalization of input data. As a result, the costs involved with normalizing data may be reduced. Regex tokens may be used and re-used by users not familiar with regular expressions, while the token rules may be quickly and easily created or updated as variations in the input data are determined. By improving the data normalization, overall performance of the information processing system may be improved. For example, instead of an end-user trying to search using many different variants for a blouse which is extra small, they may select from a user interface or enter "X-small" and see product information for apparel with that normalized value.

Illustrative System

FIG. 1 is a system 100 for data normalization using regular expression ("regex") tokens to build rules which are processed into regexs suitable for processing input data into normalized data. One or more computing devices 102(1), 102(2), . . . , 102(D) are depicted. As used in this disclosure, letters in parenthesis such as "(D)" indicate a nonzero integer value. The computing devices 102 may include desktop computers, laptop computers, thin clients, tablet computers, smartphones, servers, and so forth.

A supplier 104 is an entity which may use the computing device 102(1) to communicate with a data normalization server 106. This communication may use one or more data networks. These data networks may be public, private, or a combination thereof such as the Internet.

In one example, the supplier 104 may comprise a manufacturer or distributor who has many different products for sale. The supplier 104 provides input data 108 to the data normalization server 106. The data normalization server 106 may be operated by a merchant who will sell those products, or may be a third-party processing service which provides data normalization services.

The input data 108 may contain strings of information delimited or otherwise arranged into one or more data fields. The strings of information may include information which is expressed using one or more natural languages. A natural language includes a written human language, or a representation of an oral human language. Natural languages include, but are not limited to, American English, British English, French, Hindi, Chinese, and so forth. For example, the data field associated with size of apparel may contain string values of "extra small", "XS", "xtra-small", and so forth. The input data is discussed in more detail below with regard to FIG. 2.

The data normalization server 106 may be made up of one or more devices, distributed compute services, and so forth. For example, the data normalization server 106 may execute as a virtualized server executing across many different devices spread across datacenters in different geographic areas.

The data normalization server 106 may include a user interface module 110. The user interface module 110 may be configured to provide a user interface accessible to the computing devices 102 and users or services thereof. This user interface may be provided as a graphical user interface such as a web page having one or more files expressed as markup language such as hypertext markup language ("HTML"), an application programming interface ("API"), and so forth. For example, the supplier 104 may use a web interface provided by the user interface module 110 to upload the input data 108 from the computing device 102(1) to the data normalization server 106. In another example, the supplier 104 may have an application such as a database management system which accesses the API provided by the user interface module 110 to transfer the input data 108.

A developer 112 is a person or group of people who have skills associated with developing regular expressions. For example, the developer 112 may be a software development engineer or programmer who is familiar with composing and maintaining regexs. The developer 112 may use a computing device 102(2) to communicate with a token generation module 114 executing on the data normalization server 106. The token generation module 114 is configured to access a token library 116 storing regex tokens 118.

The token generation module 114 may be configured to accept input, such as from the developer 112 via the computing device 102(2), and generate one or more regex tokens 118. In some implementations, the regex tokens 118 may be generated externally and provided to the data normalization server 106.

The regex token 118 includes a token name and a regex phrase. For example, the regex token 118 with a token name of "<xsmall>" may refer to the regex phrase "(?i)(.*)(?<![a-z])(X\s?|X\s*-\s*|Extra\s*|Extra\s*-\s*)(small|sm|b|s\b)(.*)". The regex phrase is a sequence of one or more regular characters, metacharacters, or both.

As described above, the regular characters are those which have their literal meaning, such as the regular characters "abc" represent the first three letters in the English alphabet. In comparison, metacharacters may comprise a function such as how to parse data, or a particular input value such as a constant or a wildcard value. The regex may be considered an expression which represents a particular set of strings. The regex phrase is a portion of a regex which may be partially incomplete, include attributes which may vary, and so forth. For example, the regex phrase may include one or more attributes which can be defined during later usage, such as a particular numeric value for a range. The token name is a convenient tag or label which is associated with the regex phrase.

The token library 116 provides a repository for the regex tokens 118 which may be accessible to a user 120 via a computing device 102(3). The user 120 may be a person who does not have the technical proficiency with regular expressions. The user 120 may use a user interface 122 provided by the user interface module 110 to interact with a rule generation module 124 executing on the data normalization server 106. The token library 116 and regex tokens 118 are discussed in more detail below with regard to FIG. 3.

The rule generation module 124 is configured to generate and maintain a rule library 126 containing token rules 128. The token rule 128 may include one or more of the token names and a normalized value associated with the token name. The token rule 128 may be expressed in a human-readable, or human comprehensible, form. For example, the token rule 128 may read as "X-small,<xsmall>" which is configured to find strings designated by the regex phrase associated with the "<xsmall>" token name and normalize to the value of "X-small". The token rule 128 may also include one or more associated attributes configured to modify operation of the one or more regex phrases. For example, the attributes may indicate a constant value, range, and so forth. The rule library 126 and token rules 128 are discussed in more detail below with regard to FIG. 4.

The rule generation module 124 may generate token rules 128 based on input from the user 120. For example, the user interface module 110 may provide the user interface 122 as a web interface on the computing device 102(3). The user 120 may use the web interface to select one or more regex tokens 118 from the token library 116, arrange them in a desired sequence, indicate associated attributes, designate the normalized value, and so forth. The rule generation module 124 may be configured to enforce a syntax and grammar with respect to the token rules 128. In one implementation, the grammar may call for a token name only being referenced once within a token rule 128. In other implementations the grammar may permit use of the same token name multiple times within the same token rule 128.

The data normalization server 106 may include a machine learning module 130. The machine learning module 130 is configured to use one or more machine learning techniques to generate at least some of the regex token 118, the token rules 128, or both. As a result, the machine learning module 130 allows one or more of the modules such as the token generation module 114 or the rule generation module 124 to operate without explicit programming from a human.

The machine leaning techniques may include supervised learning systems such as neural networks, Bayesian networks, instance-based learning, statistical classification, and so forth. In the supervised learning systems a human operator, such as the supplier 104, the developer 112, or the user 120 provides input or assessments as to the output. This input may be used to generalize a function which may then be used to speculatively generate an output for previously unseen inputs. For example, a neural network may be trained with a set of strings which are equivalent to one another to be able to determine other equivalent strings. Continuing the example, the neural network may learn from the regex phrase descriptive of the set of strings for "X-Small", "Womens X-Small", "XS", "Ladies Extra Small", "US XS (0-2)", "XSML" that these strings are deemed equivalent to one another for the purpose of data normalization. Based on this, the neural network may automatically determine that "Ladies Very Small" is also equivalent. From this equivalency a regex token 118 having a regex phrase which is descriptive of the set including "Ladies Extra Small", or a token rule 128 may be included.

The machine learning techniques may also include unsupervised learning systems such as neural networks, cluster analysis, and so forth. The unsupervised learning systems may operate on unlabeled examples, may determine structure within the data without prior knowledge. For example, cluster analysis may be applied to the input data to determine the various values which may represent a common size.

A regular expression generation module 132 is configured to generate and store in a regex library 134 one or more regular expressions 136 generated from the token rules 128 and the referenced regex tokens 118. The regular expressions 136 are complete in that they may include regular character, metacharacters, attribute values, ranges, normalized value(s), and so forth. In some implementations, each complete regular expression 136 may be processed independently of any other regular expression 136. However, a plurality of these regular expressions 136 may be processed serially or in parallel. Other functions may be used to replace data, modify data, move data, and so forth.

The regular expressions 136 may compliant with one or more standards including but not limited to the Portable Operating System interface ("POSIX") Standard, Basic Regular Expressions ("BRE"), Extended Regular Expressions ("ERE"), "Simple Regular Expressions" ("SRE") and so forth as promulgated by the Institute for Electrical and Electronics Engineers. The regular expressions 136 may be also be expressed in the Perl family of programmatic languages.

The regular expression generation module 132 may be configured to optimize the resulting regular expressions 136. This optimization may be to minimize processor usage, minimize memory required, reduce overall size of the regular expression 136, and so forth. The generation of the regular expression 136 may include one or more of merging a plurality of the regex phrases, removing one or more redundant regex phrases, or changing one or more of the regex phrases based at least in part on presence of another regex phrase in the same token rule 128. The merging of the plurality of regex phrases may be used to consolidate related or similar regex phrases, thus reducing processing requirements. The regex phrase may be changed from one form to another to avoid an adverse interaction with another regex phrase which would otherwise be incorporated into the same regular expression 136. In some situations, the regular expression module 132 may change the regex phrase from one form to another which has been deemed more efficient, regardless of the presence of other regex phrases implicated by the same token rule 128.

A normalization module 138 may access the regex library 134 and the regular expressions 136 stored therein. The normalization module 138 may include a regular expression engine configured to process the regular expression 136 and search for the string patterns expressed therein. The engine may be part of a language, such as the Perl language, PHP, Python, Ruby, or may comprise a library of functions such as ccpre, Jregex, XRegEXp, and so forth.

The normalization module 138 generates normalized data 140. The generation may include finding the strings in the one or more data fields using the regular expression 136. Once found, the strings may be replaced with the normalized value to form the normalized data 140. In another implementation, the string may be found in one data field and used to populate or replace a value in another data field. The normalized data 140 may either be a modified version of the input data 108, or may be a new file based on the input data 108. The regex library 134 and regular expressions 136 are discussed in more detail below with regard to FIG. 5.

The normalized data 140 may then be stored on one or more storage servers 142. The storage servers 142 may then be used to provide the normalized data 140 to other services. For example, a web service may retrieve the normalized data 140 from the storage server 142 and provide information about the products described therein to an end-user by way of a computing device 102. The data normalization server 106 improves the end-user experience by providing the normalized data 140 which is more easily and consistently searched. The suppliers 104, developers 112, and the users 120 also benefit by way of being able to more easily generate and maintain the regex tokens 118 and token rules 128 which ultimately are converted into regular expressions 136.

Figure 2:
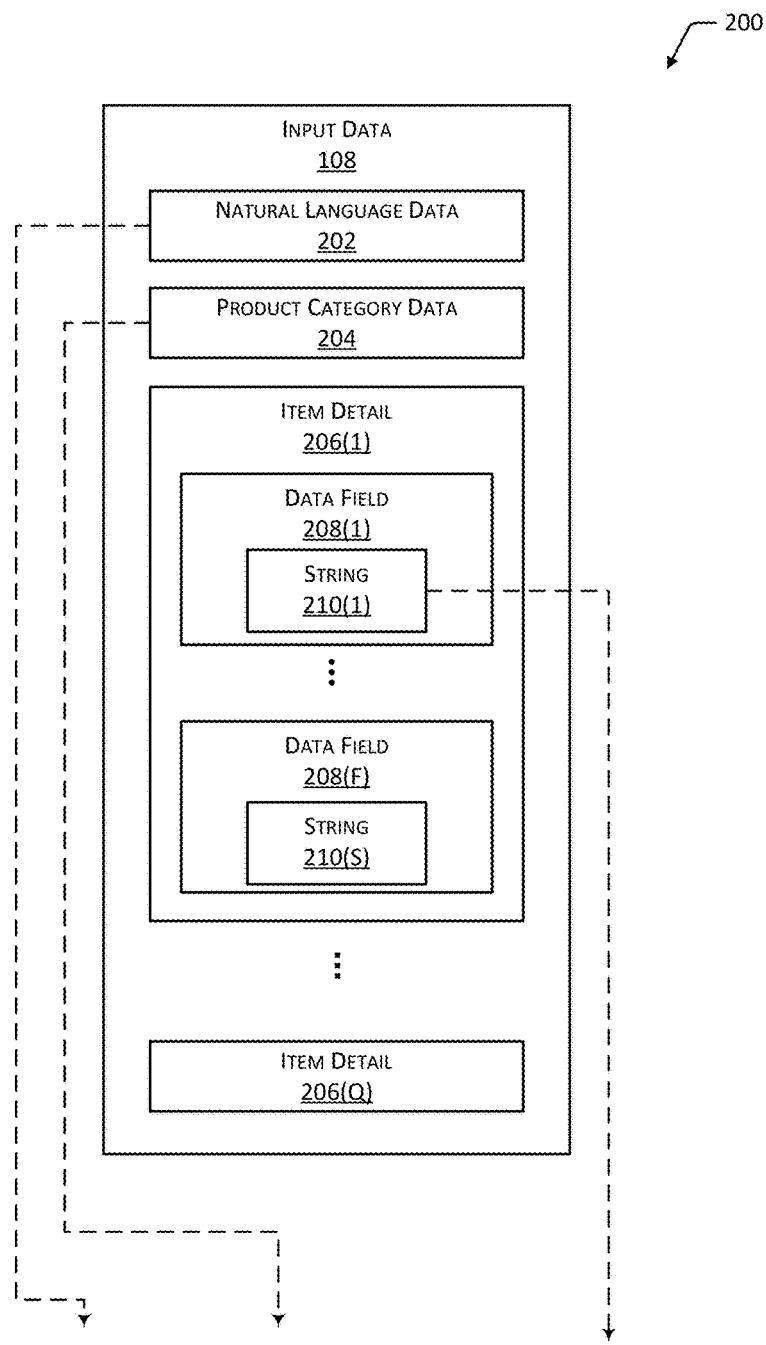
FIG. 2 is a block diagram of the input data.

FIG. 2 is a block diagram 200 of the input data 108. The input data 108 may comprise information which has been machine generated, human generated, or a combination thereof. The input data 108 is described in this disclosure by way of example, and not necessarily as a limitation, as expressing information about products for sale. In other examples, the input data 108 may comprise weather data, medical records, and so forth.

The input data 108 may include natural language data 202. The natural language data 202 indicates the human natural language in which at least a portion of the input data 108 is encoded or expressed. For example, the natural language data 202 may indicate that the input data 108 is written using American English. The natural language data 202 may be used by the server 106 to determine which regex tokens 118, token rules 128, regular expressions 136, and so forth are applicable to a particular piece of input data 108. For example, size descriptions in American English may use the string "Large" while in French the equivalent string is "Grande". As a result, the system 106 may adjust for linguistic differences.

Product category data 204 may also be included in the input data 108. The product category data 204 provides information indicative of a grouping or aggregation level associated with the information in the input data 108. For example, the product category data 204 may indicate "auto parts", "women's apparel", "men's apparel", "cosmetics" and so forth. The product category data 204 may be used by the data normalization server 106 to determine which regex tokens 118, token rules 128, regular expressions 136, and so forth are applicable to a particular piece of input data 108. For example, the size descriptions for "women's apparel" may use different strings than "men's apparel". As a result, the system 106 may adjust for differences in phrasing which occur in different product types.

Item details 206(1), 206(2), . . . , 206(Q) may comprise individual records within the input data 108 providing information about different items. These items may be physical goods, services, access rights to content, license codes, and so forth. For example, the items may include shirts or access rights to a movie using a streaming content delivery service. The items may be provided in transactions including but not limited to sale, lease, licensing, rental, gifting, promotional giveaway, and so forth. For convenience and not by way of limitation, the examples in this disclosure refer to "sale", however the systems and techniques described herein may be used for these other types of transactions.

The item detail 206 may include one or more data fields 208(1), 208(2), . . . , 208(F). These data fields 208 may be delimited or differentiated from one another by way of special characters within the data, by way of formatting, particular data structures, and so forth. For example, data fields 208 may be defined for "size", "description", "color", "material", and so forth.

Within each data field 208 a string 210 or value may be stored. For example, within the data field 208 for "size" the value may be "Extra Small". As described above, the supplier 104 may not provide information in which equivalent strings 210 are identical. This may be due to poor data quality control, human variation in data entry, and so forth. For example, the information found in item detail 206(1) for a camisole may have originally been entered by one data entry operator a size of "Extra Small" while the item detail 206(2) for a tank top entered by another data entry operator may have a size of "Xtra Sm". Similarly, different divisions of the same supplier 104 or different suppliers 104 may use different strings to mean the same things.

As a result of this variation in the strings 210, the data normalization server 106 is configured to process the input data 108 containing these variations and produce normalized data 140 for use.

In this illustration exemplary input data 212 is depicted, showing three rows of item details 206. As shown here, in some implementations the natural language data 202, the product category data 204, or both may be included in the item detail 206. For example, a supplier 104 who provides products for France and the United States may include in a single file of input data 108 products described in French and America English. As shown here, the first two item details 206 use the natural language American English, with one in the product category of "men's apparel" and another in the product category of "auto parts". In comparison, the third record is in French and for "l'habillement des femmes" (or "women's apparel"). In other implementations, the natural language data 202, product category data 204, or other information which may be globally applicable to all of the input item detail 206 within the input data 108 may be included as a header record or file.

Figure 3:
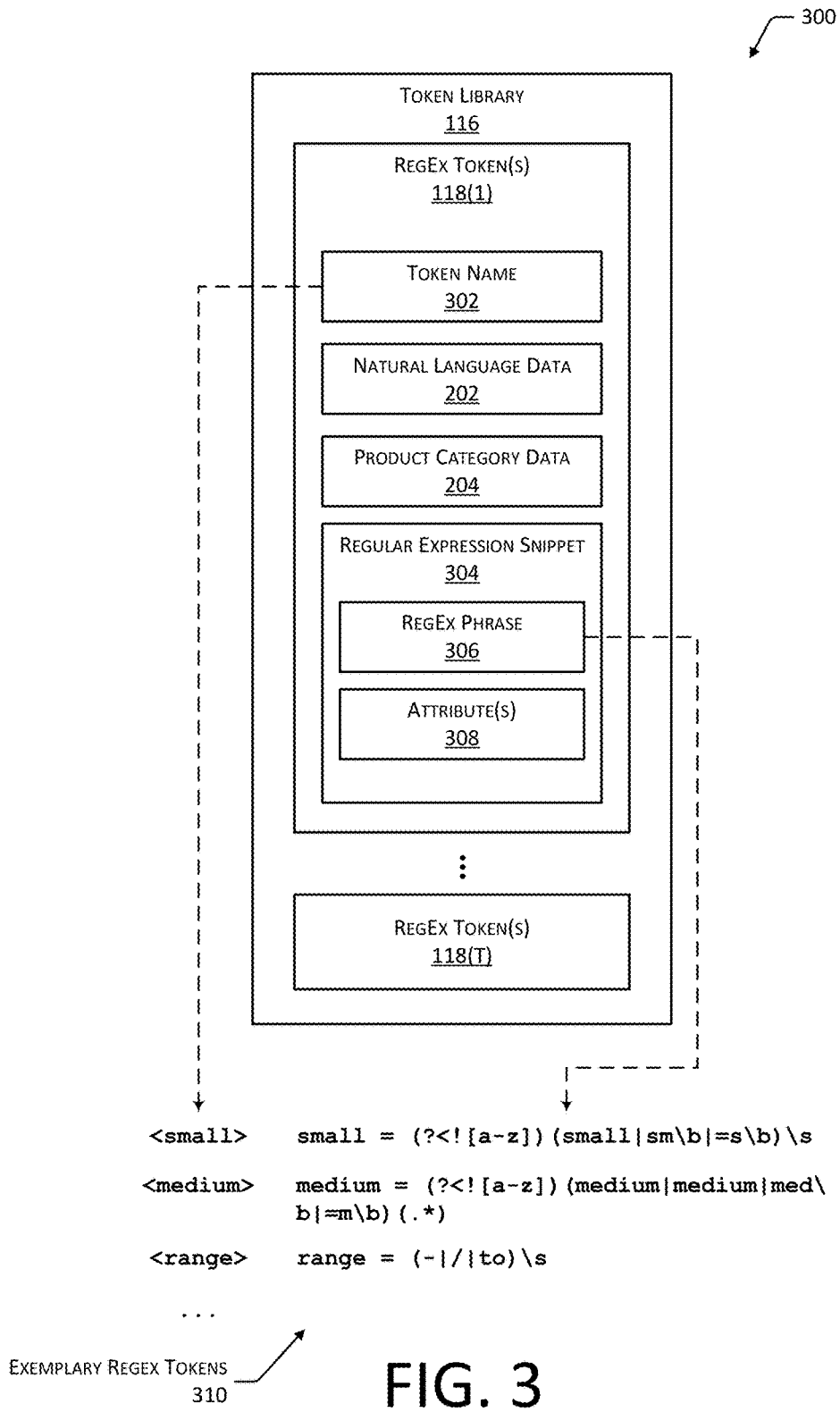
FIG. 3 is a block diagram of a token library containing one or more regex tokens.

FIG. 3 is a block diagram 300 of the token library 116 which may contain one or more regex tokens 118(1), 118(2), . . . , 118(T). The regex token 118 may include a token name 302, a regular expression snippet 304, and may also include one or more of natural language data 202, product category data 204, or other information.

The token name 302 provides a human-readable convenient tag. The token name 302 may, but need not, be indicative of the underlying functionality or usage of the regex token 118 to provide some mnemonic functionality. The token name 302 may be expressed using one or more alphanumeric characters. For example, the token name 302 may be "Xsmall". As discussed below, to distinguish the token name 302 from other portions of the token rule 128, brackets or other characters may be used to indicate that a particular string is the token name 302. For example, the token name 302 may be indicated in a token rule 128 as "<tokenname>", "[tokenname]", and so forth.

The token name 302 is associated with a regular expression snippet 304. The token name 302 may be considered to be a referent or pointer to the regular expression snippet 304. The regular expression snippet 304 includes a regex phrase 306 and may include one or more attributes 308 implicated by the regex phrase.

The regex phrase 306 is a sequence of one or more regular characters, metacharacters, or both. Compared to the complete regular expressions 136, the regex phrase 306 may be incomplete or dependent on other inputs in order to be executable.

The regex phrase 306 may include one or more attributes 308. The attributes 308 are configured to modify operation of the one or more regex phrases 306. The attributes 308 may be range values, constants, and so forth which may be provided for in the token rules 128 or otherwise defined during later usage or processing. The attributes 308 thus allow for reuse of the same regex phrase 306 in different rules, providing some degree of flexibility which is accessible for the user 120 without exposing the complexity of regular expression syntax and grammar.

The regex tokens 118 may be specific for a particular natural language, product category, or both. In some implementations the regex token 118 may be associated with particular natural language data 202, product category data 204, or both. The same token name 302 may thus be associated or reused with several different regular expression snippets 304(1), 304(2), . . . , 304(S), a particular one of which is designated based on the natural language data 202, product category data 204, and so forth of the input data 108. For example, the token name "xsmall" may be associated with one regex phrase 306(1) for women's apparel, another regex phrase 306(2) for men's apparel, and a third regex phrase 306(3) for auto parts. In this way, the user 120 may use a familiar and common token name 302 while the underlying regex phrases 306 are appropriate for the different strings 210 encountered in the different item detail 206 for different input data 108. Continuing the example, the user 120(1) working with normalizing input data 108 for apparel may use the token name 302 "xsmall" while another user 120(2) working with normalizing input data 108 for auto parts may also use the "xsmall" token name 302, with each ultimately referring to different regex phrases 306 searching for different patterns.

Exemplary regex tokens 310 are illustrated here. In this example, the token name is expressed within brackets, such as "<small>" or "<range>". Adjacent to each is an associated regex phrase 306.

Figure 4:
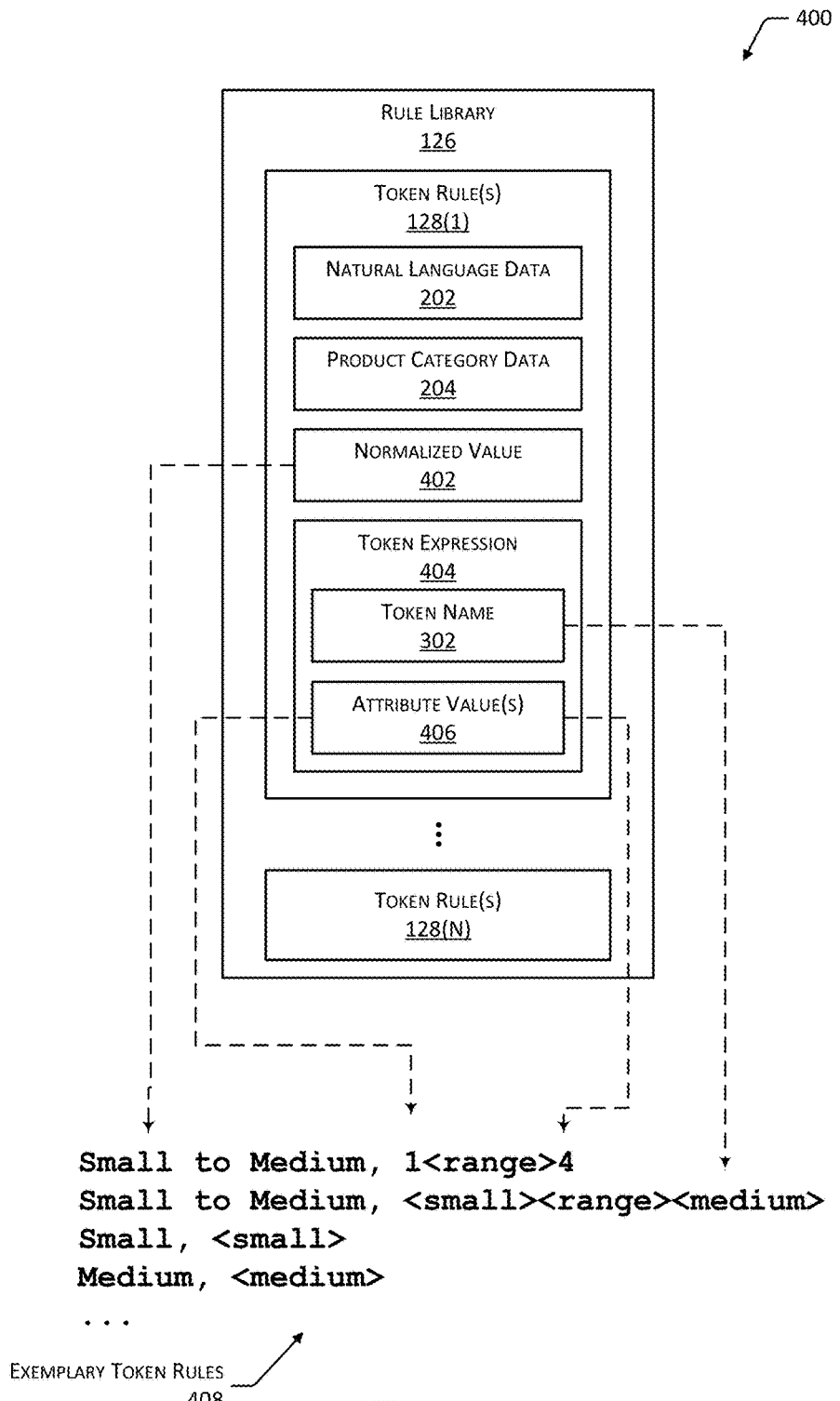
FIG. 4 is a block diagram of a rule library containing one or more token rules referencing one or more of the regex tokens.

FIG. 4 is a block diagram 400 of the rule library 126 which may contain one or more token rules 128 referencing one or more of the regex tokens 118. The token rules 128 include a normalized value 402, a token expression 404, and may also include natural language data 202, product category data 204, or other information.

The normalized value 402 comprises a string which will be used to generate a new data field 208, or replace or update an existing string 210. The normalized value 402 may be considered in some implementations to be the value which the user 120 wants all equivalent strings to be set to. The normalized value 402 may be a constant, or may be a variable defined by a particular function.

The token expression 404 includes the token name 302, and may include one or more attribute values 406. These attribute values 406 may be passed during processing such that they are used to populate or modify the attributes 308 for the regex phrase 306 in the regular expression snippet 304. The attribute values 406 may be manually entered, such as by the user 120, or may be provided by the machine learning module 130.

The token rules 128 may be specific for a particular natural language, product category, or both. As such, the rule generation module 124, the regular expression generation module 132, and so forth, may be configured to associate the token rules 128 with particular natural language data 202, product category data 204, or both. The same token rule 128 may thus be associated or reused with input data 108 of different types. For example, the token rule 128(1) "small, 1<range>2" may be associated with the product category of apparel while the token rule 128(2) "small, 1<range>2" having the same phrasing is associated with auto parts. As described above, due to the variation in the natural language, product category, and so forth, the token rules 128 may refer to different underlying regex phrases 306.

Also illustrated are exemplary token rules 408. As shown the overall format of the token rule 128 is simple for the user 120 to create, modify, and read. For example, to normalize the variations of the size small to the normalized value 402 of "Small", the user 120 inputs "Small, <small>". The user 120 may be unaware that they are calling the regex phrase 306 of "(?i)(.*)(?<![a-z])(X\s?|X\s*-\s*|Extra\s*|Extra\s*-\s*)(small|sm\b|s\b)(.*)".

Figure 5:
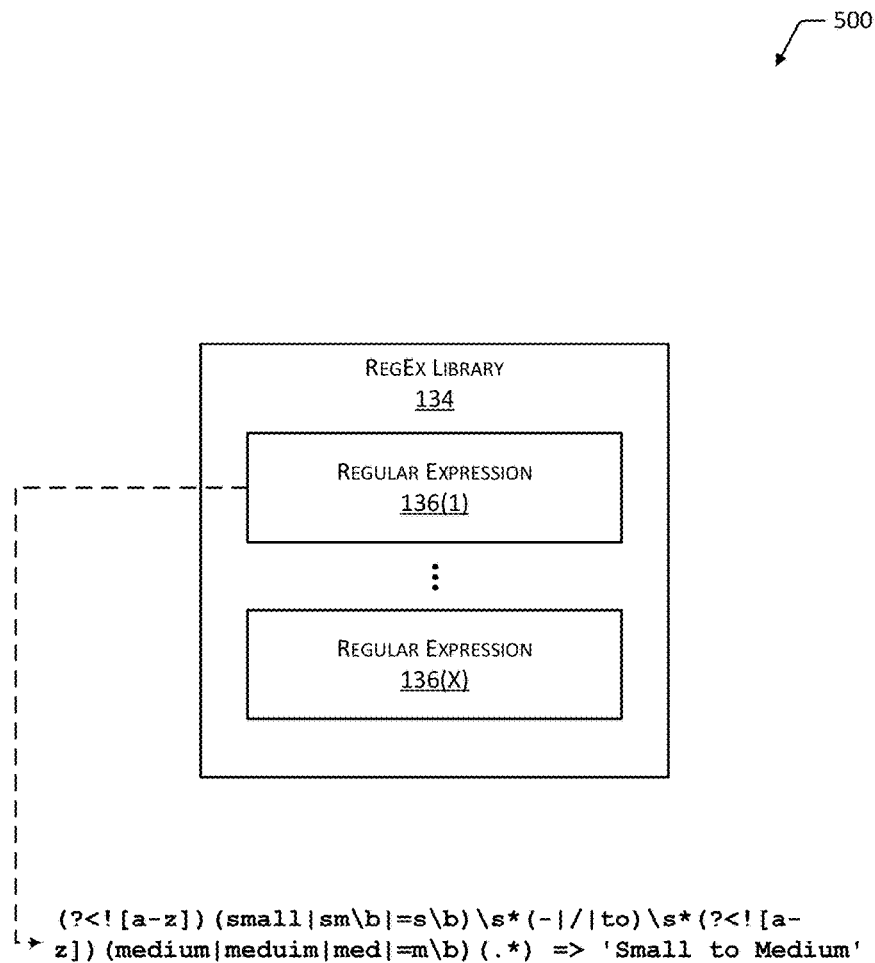
FIG. 5 is a block diagram of a regex library containing one or more regexs generated from the one or more token rules.

FIG. 5 is a block diagram 500 of the regex library 134 containing one or more regular expressions 136 generated from the one or more token rules 128. As described above, the regular expression generation module 132 processes the token rules 128 which are applicable to the input data 108 and may generate one or more regular expressions 136. These regular expressions 136 may be stored in the regex library 134 for ongoing use. In some implementations a hash or change flag may be used to detect changes in the token rules 128 applicable to a particular set of regular expressions 136, and update the regular expressions 136 in the regex library 134 accordingly. For example, after the user 120 modifies a token rule 128, the corresponding regular expressions 136 may be regenerated and stored in the regex library 134 for use. Particular regular expressions 136 may be associated with various combinations of natural languages, product categories, particular suppliers 104, and so forth.

Figure 6:
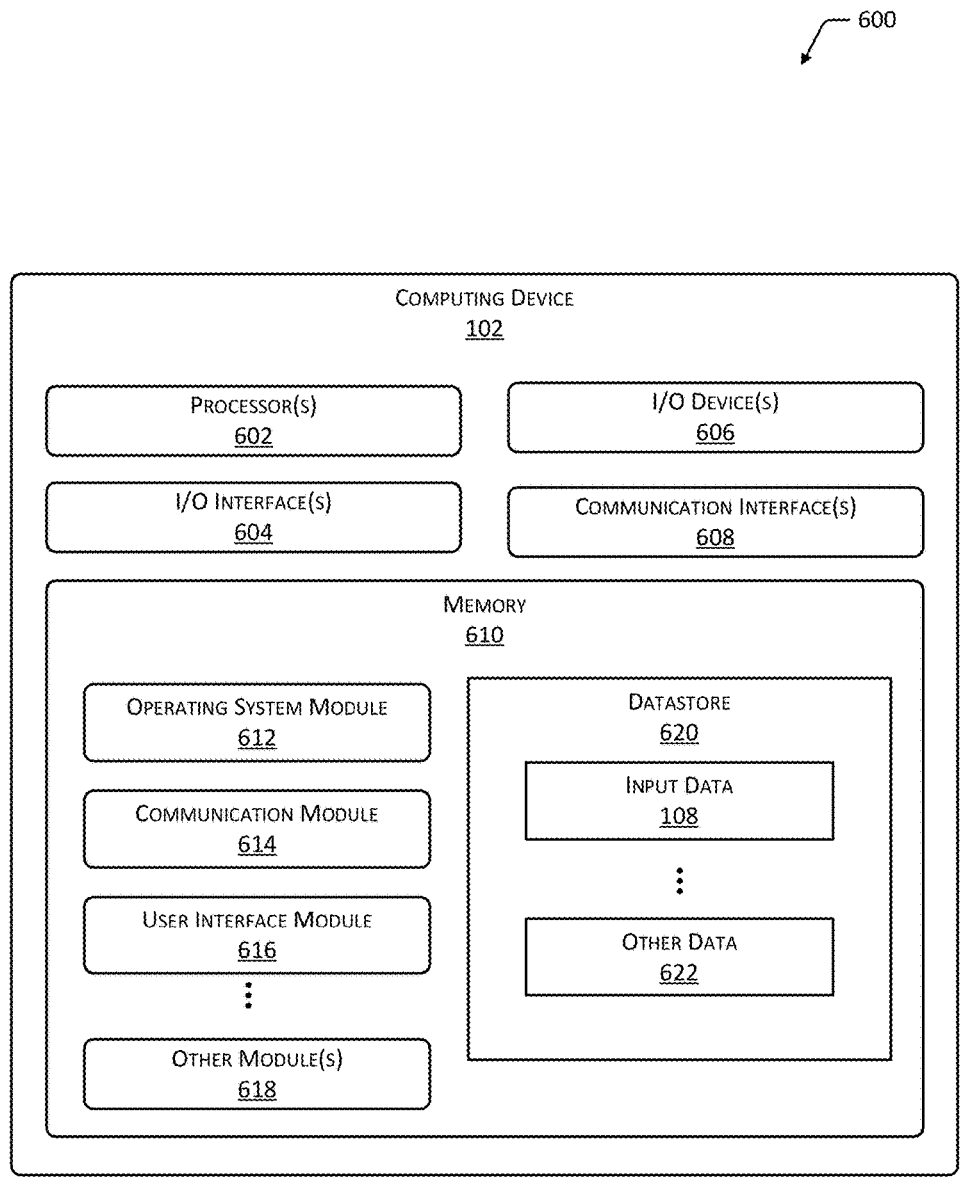
FIG. 6 illustrates a block diagram of a computing device which may be used to provide the input data, generate regex tokens, or generate token rules.

FIG. 6 illustrates a block diagram 600 of the computing device 102 which may be used to provide the input data 108, generate regex tokens 118, generate token rules 128, and so forth. The computing device 102 may include one or more processors 602 configured to execute one or more stored instructions. The processors 602 may comprise one or more cores. The computing device 102 may include one or more input/output ("I/O") interface(s) 604 to allow the processor 602 or other portions of the computing device 102 to communicate with other devices. The I/O interfaces 604 may comprise inter-integrated circuit ("I2C"), serial peripheral interface bus ("SPI"), Universal Serial Bus ("USB") as promulgated by the USB Implementers Forum, RS-232, and so forth.

The I/O interface(s) 604 may couple to one or more I/O devices 606. The I/O devices 606 may include input devices such as one or more of a keyboard, sensors, accelerometers, and so forth. The I/O devices 606 may also include output devices such as one or more of a display, printer, and so forth. In some embodiments, the I/O devices 606 may be physically incorporated with the computing device 102 or may be externally placed and communicatively coupled thereto.

The computing device 102 may also include one or more communication interfaces 608. The communication interfaces 608 are configured to provide communications between the computing device 102 and other devices such as the data normalization servers 106, routers, access points, and so forth. The communication interfaces 608 may include devices configured to couple to one or more networks including local area networks, wide area networks, and so forth.

The computing device 102 may also include one or more busses or other internal communications hardware or software that allow for the transfer of data between the various modules and components of the computing device 102.

As shown in FIG. 6, the computing device 102 includes one or more memories 610. The memory 610 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 610 provides storage of computer readable instructions, data structures, program modules, and other data for the operation of the computing device 102.

The memory 610 may include at least one operating system ("OS") module 612. The OS module 612 is configured to manage hardware resource devices such as the I/O interfaces 604, the I/O devices 606, the communication interfaces 608, and provide various services to applications or modules executing on the processors 602. Also stored in the memory 610 may be one or more of the following modules. These modules may be executed as foreground applications, background tasks, daemons, and so forth.

A communication module 614 is configured to support communication between the data normalization servers 106 using one or more networks. For example, the communication module 614 may implement a transmission control protocol/internet protocol ("TCP/IP") stack for communication. Other functionality such as encryption, session authentication, and so forth may also be provided.

A user interface module 616 may be configured to provide a user interface to operators of the computing device 102. This user interface may be provided as a graphical user interface, character user interface, audible interface, haptic interface, and so forth.

The user 120 may use the user interface to generate the token rule 128 that matches clothing sizes that look like "Extra-small to Small". For example, "XS-S", "xsml to sml", or "Extra-Small/Small" are the same as "Extra-Small to Small".

The user 120 may build the token rule 128 which directs the data normalization server 106 to find all the variations and normalize them to the same normalized value 402 "Extra-small to Small". This normalization may improve the quality of the data provided to the storage servers 142, improve future searches, and so forth.

Continuing the example, the regex token 118(1) "<xsmall>" may be accessed from the token library 116 using the user interface. As described above, the regex token 118 has been previously generated, such as by the developer 112, and automated system, or a combination thereof. The regex token 118(1) includes the regex phrase 306(1) configured to match the different ways the supplier(s) 104 may indicate a size is "extra small", such as "XS", "XSM", "XSML", X-SML", "X-SMALL", "EXTRA-S", and so forth. The regex token 118(2) for "<small>" comprises a regex phrase 306(2) configured to match small sizes. The regex token 118(3) for "<range>" comprises a regex phrase 306(3) configured to detect strings indicating a range of sizes, such as ones including the characters "-", "/", "to", and so forth.

The user 120 may create the token rule 128(1) of "Extra-small to Small, <xsmall><range><small>". The regular expression generation module 132 may process the token rule 128(1), accessing the regex tokens 118(1)-(3) which are referred to. In generating the regular expression 136, the regular expression generation module 132 may replace the regex tokens 118 with the corresponding regular expression snippets 304 and attributes 308. For example, "<range>" may be replaced with "\s*(-|/|to)\s*", while "<small>" is replaced with "\s*(?<![a-z])(small|sml|sm\b|=s\b)" and "<xsmall>" replaced with "\s*(?<![a-z])(X|xtra|Extra)(\s*-?\s*)(small|sml|sm\b|s\b)" resulting in: "\s*(?<![a-z])(X|xtra|Extra)(\s*-?\s*)(small|sml|sm\b|s\b)\s*(-|/|to)\s*\s*(?<![a-z])(small|sml|sm\b|=s\b)".

The regular expression generation module 132 may add, remove, or modify the regex phrases 306. For example, instructions to allow any character to match at the beginning may be added, such as with this regular expression phrase 306 "(.*)\s*(?<![a-z])(X|xtra|Extra)(\s*-?\s*)(small|sml|sm\b|s\b)\s*(-|/|to)\s*\s*(?<![a-z])(small|sml|sm\b|=s\b)". Likewise, instructions to allow any character to match at the end may be added, such as "(.*)\s*(?<![a-z])(X|xtra|Extra)(\s*-?\s*)(small|sml|sm\b|s\b)\s*(-|/|to)\s*\s*(?<![a-z])(small|sml|sm\b|=s\b)(.*)". Instructions to allow case insensitive matches may be included, to form the initial regular expression 136(1) of "(?i)(.*)\s*(?<![a-z])(X|xtra|Extra)(\s*-?\s*)(small|sml|sm\b|s\b)\s*(-|/|to)\s*\s*(?<![a-z])(small|sml|sm\b|=s\b)(.*)".

The regular expression generation module 132 may proceed to perform one or more optimizations on the initial regular expression 136. For example, the initial regular expression 136(1) may be simplified to the final regular expression 136 suitable for use of "(?i)(.*)(?<![a-z])(X|xtra|Extra)(\s*-?\s*)(small|sml|sm\b|s\b)\s*(-|/|to)\s*(?<![a-z])(small|sml|sm\b|=s\b)(.*)".

Using these techniques, the user 120 is thus able to manipulate the regex tokens 118 into the token rule 128 of "<xsmall><range><small>", which is then automatically converted into the regular expression 136 of "(?i)(.*)(?<![a-z])(X|xtra|Extra)(\s*-?\s*)(small|sml|sm\b|s\b)\s*(-|/|to)\s*(?<![a-z])(small|sml|sm\b|=s\b)(.*)" without any knowledge of how to manipulate regular expressions.

In some implementations, the user interface 122 may be configured to allow the user 120, automated systems, or others to generate query comprising one or more regex tokens 118 which may be used to generate a regular expression 136 to query previously stored data.

In this example, the user 120 may wish to identify data for women's apparel which is like "18 Plus". As described above, the regex token 118(4) of "<plussize>" may have been previously generated and stored in the token library 116. This regex token 118(4) includes a regex phrase 306(4) configured to match the different ways a clothing size may be defined as a "plus".

The user 120 may generate a query with the user interface 122 comprising "18<plussize>". The "18" in this example comprises an attribute value 406 which will modify the regular expression 136(4) generated from the regex token 118(4) "<plussize>".

The regular expression generation module 132 replaces the regex token 118(4) with the corresponding regex phrase 306(4) "18\s*(?<![a-z])(plus|X\b|W\b|P\b)". This phrase may be modified to allow any set of characters to match at the beginning, except for a number, in order to avoid incorrect matches such as "118 Plus" matching "18 Plus", while "=18 Plus" or "44EU/18 Plus" is acceptable as being equivalent. The resulting regular expression 136 of "(.*)(?<![0-9]) 18\s*(?<![a-z])(plus|X\b|W\b|P\b)" is produced.

The regular expression generation module 132 may further modify the expression by allowing any character to match at the end, resulting in the regular expression 136(4) of "(.*)(?<![0-9]) 18\s*(?<![a-z])(plus|X\b|W\b|P\b)(.*)". Further modifications may allow case insensitive matches, such as "(?i)(.*)(?<![0-9])18\s*(?<![a-z])(plus|X\b|W\b|P\b)(.*)".

Similar to the example above, the straightforward and human-readable query of "18<plussize>" is processed by the system 100 to generate the regular expression 136(4) without the user 120 having to code or directly manipulate regular expression language.

Other modules 618 may also be present. For example, an authentication module may determine identity of the operator of the computing device 102.

The memory 610 may also include a datastore 620 to store information. The datastore 620 may use a flat file, database, linked list, tree, executable code, or other data structure to store the information. In some implementations, the datastore 620 or a portion of the datastore 620 may be distributed across one or more other devices including servers, network attached storage devices, and so forth.

As depicted here, the datastore 620 may store the input data 108, regex token 118, token rules 128, and so forth.

Other data 622 such as user preferences, configuration data, and so forth may also be stored in the datastore 620.

Figure 7:
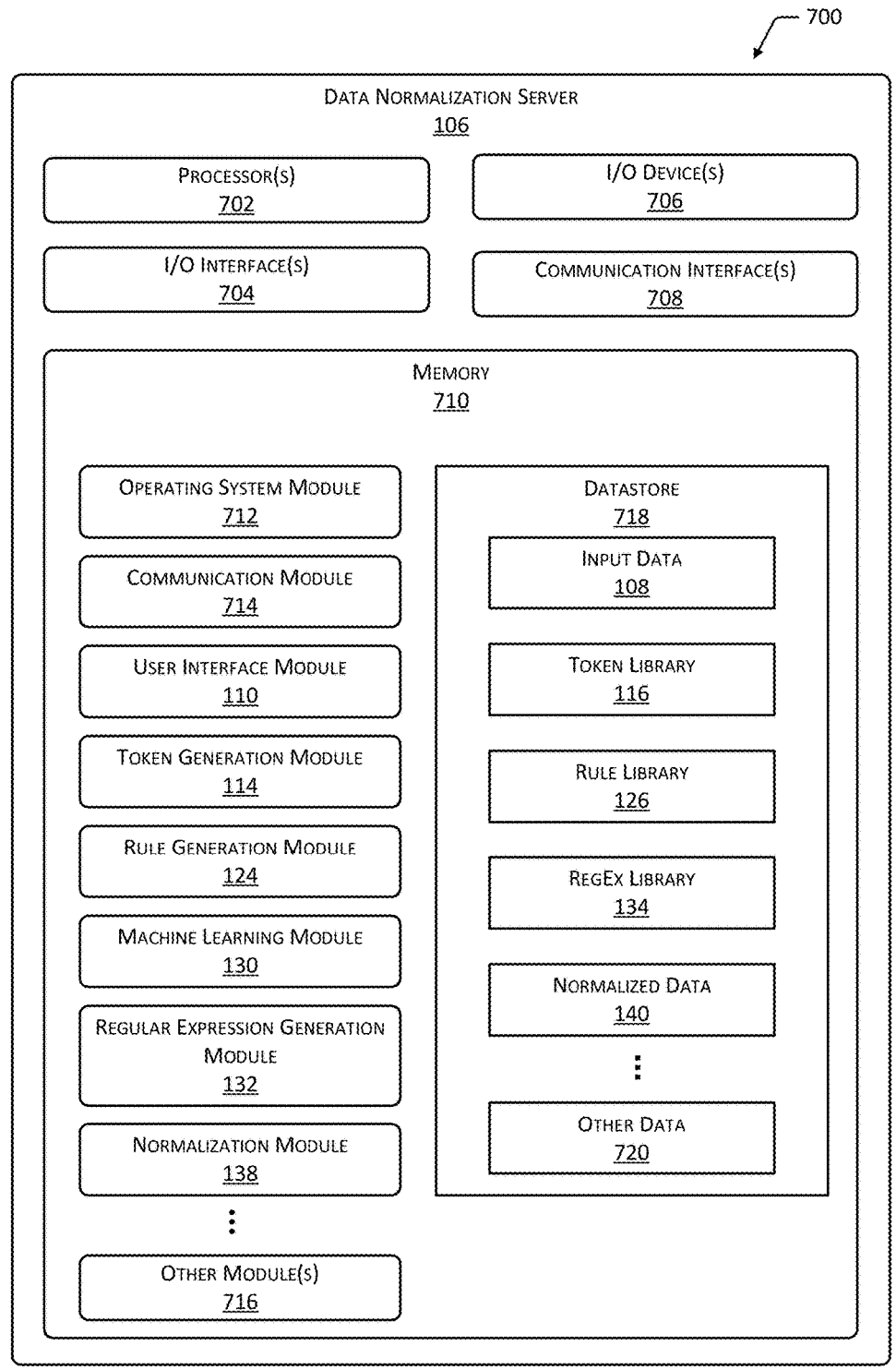
FIG. 7 illustrates a block diagram of a server configured to normalize data using the regex tokens.

FIG. 7 illustrates a block diagram 700 of the data normalization server 106. The data normalization server 106 may comprise a single computing device or across multiple computing devices in one or more physical locations. For example, the modules described herein may operate as a service provided by multiple virtual devices executing on computing devices distributed across the globe.

The data normalization server 106 may include one or more processors 702 configured to execute one or more stored instructions. The processors 702 may comprise one or more cores. The data normalization server 106 may include one or more I/O interface(s) 704 to allow the processor 702 or other portions of the data normalization server 106 to communicate with other devices. The I/O interfaces 704 may comprise I2C, SPI, USB, RS-232, and so forth.

The I/O interface(s) 704 may couple to one or more I/O devices 706. The I/O devices 706 may include input devices such as one or more of a keyboard, sensors, and so forth. The I/O devices 706 may also include output devices such as one or more of a display, printer, and so forth. In some embodiments, the I/O devices 706 may be physically incorporated with the data normalization server 106 or may be externally placed and communicatively coupled thereto.

The data normalization server 106 may also include one or more communication interfaces 708. The communication interfaces 708 are configured to provide communications between the data normalization server 106 and other devices such as network attached storage, the computing devices 102, routers, access points, and so forth. The communication interfaces 708 may include devices configured to couple to one or more networks including local area networks, wide area networks, and so forth.

The data normalization server 106 may also include one or more busses or other internal communications hardware or software that allow for the transfer of data between the various modules and components of the data normalization server 106.

As shown in FIG. 7, the data normalization server 106 includes one or more memories 710. The memory 710 comprises one or more CRSM. The memory 710 provides storage of computer readable instructions, data structures, program modules, and other data for the operation of the data normalization server 106.

The memory 710 may include at least one OS module 712. The OS module 712 is configured to manage hardware resource devices such as the I/O interfaces 704, the I/O devices 706, the communication interfaces 708, and provide various services to applications or modules executing on the processors 702. Also stored in the memory 710 may be one or more of the following modules. These modules may be executed as foreground applications, background tasks, daemons, and so forth.

A communication module 714 is configured to support communication with other data normalization servers 106, the computing devices 102, and so forth using one or more networks. For example, the communication module 714 may implement a transmission control protocol/internet protocol ("TCP/IP") stack for communication.

The user interface module 110 as described above may be configured to provide a user interface accessible to the computing devices 102 and operators thereof. The user interface may be provided as a graphical user interface such as web page expressed as markup language such as HTML, an API, and so forth.

The token generation module 114 is configured to access the token library 116 storing the regex tokens 118. The token generation module 114 may be configured to accept input, such as from the developer 112 via the computing device 102(2), and generate one or more regex tokens 118 based on this input. The token generation module 114 may also work in conjunction with the machine learning module 130 to generate the regex tokens 118. For example, the machine learning module 130 may analyze the regex tokens 118 being produced manually and may automatically generate additional regex tokens 118.

The rule generation module 124 may be stored in the memory 710 and is configured to generate and maintain the rule library 126 containing the token rules 128. The rule generation module 124 may generate rules based on input from the user 120, or based on input from the machine learning module 130. For example, the user 120 may use the web interface to select one or more regex tokens 118 from the token library 116, arrange them in a desired sequence, indicate associated attribute values 406, designate the normalized value 402, and so forth. The rule generation module 124 may be configured to enforce a syntax and grammar with respect to the token rules 128, confirm a context such as the natural language or product category, and so forth.

The machine learning module 130 is configured to use one or more machine learning techniques to generate at least a portion of the regex token 118, the token rules 128, or both. The machine learning module 130 may use one or more supervised learning systems, unsupervised learning systems, statistical systems, and so forth.

The memory 710 may also store the regular expression generation module 132 configured to generate the regular expressions 136 based on the token rules 128 and the referenced regex tokens 118. The regular expressions 136 are complete in that each may be processed independently of any other regex 136. The regular expression generation module 132 may modify, merge, optimize, and otherwise manipulate the regex phrases 306 implicated by the token rules 128.

As described above, the normalization module 138 may access the regex library 134 and the regular expressions 136 stored therein. A regular expression engine uses these regular expressions 136 to process the input data 108 and search for particular strings 210 matching the pattern defined by the regular expressions 136. Once found, these strings 210 may be replaced or modified to the normalized value 402. In some implementations, the string 210 may be found in one data field and used to populate or replace a value in another data field. For example, a "size" data field 208(1) may be empty for a record, while the sizing information is included as part of a "description" data field 208(2). The string 210 may be located in the "description", and based on this the normalized value 402 may be written to the size data field 208(1).

Other modules 716 may also be present. For example, an authentication module may determine identity of the developer 112, while an access control module controls the activities of the developer 112 based at least in part on that identity.

The memory 710 may also include a datastore 718 to store information. The datastore 718 may use a flat file, database, linked list, tree, executable code, or other data structure to store the information. In some implementations, the datastore 718 or a portion of the datastore 718 may be distributed across one or more other devices including servers, network attached storage devices, and so forth.

As depicted here, the datastore 716 may store the input data 108, the token library 116, the rule library 126, the regex library 134, or the normalized data 140. Other data 720 may also be stored such as configuration data, access privileges for users, and so forth.

Illustrative Process

Figure 8:
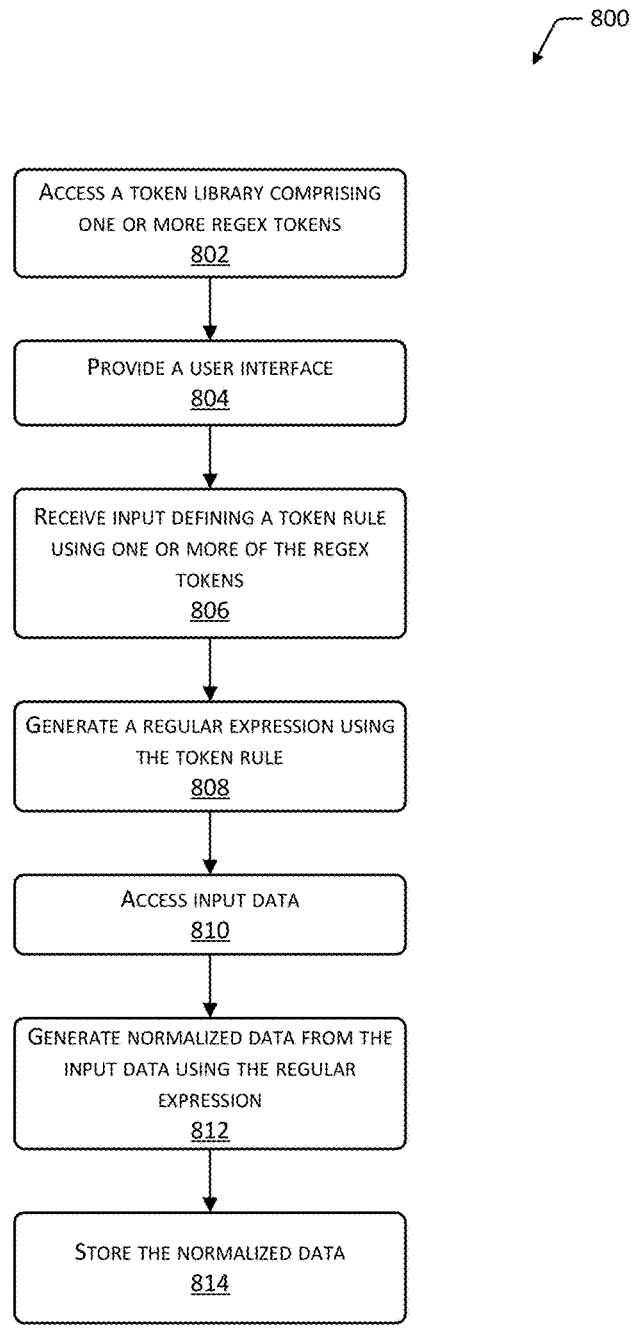
FIG. 8 is a flow diagram of a process of normalizing data using regex tokens.

FIG. 8 is a flow diagram 800 of a process of normalizing data using regex tokens 118 and token rules 128 based on those regex tokens 118. One or more of the modules in the data normalization server 106 may perform the process.

Block 802 accesses the token library 116 comprising one or more regex tokens 118. As described above, the regex token 118 may include a token name 302 and a regex phrase 306. The regex phrase 306 may comprise a sequence of one or more regular characters, metacharacters, or both. The sequence being indicative of a search pattern.

In one implementation, the machine learning module 130 may operate in conjunction with the token generation module 114 to generate at least one of the one or more regex tokens 118. The user interface module 110 may present at least a portion of the input data 108 using the user interface 122 to the developer 112, the user 120, or another operator. User input may be received from the user interface 122 which is indicative of a search pattern within the portion of the input data 108. For example, the user may select several different strings which are deemed equivalent to one another. The machine learning module 130 may process the user input using one or more machine learning techniques to generate the regex phrase 306. Additional testing and verification may be provided. For example, the regex phrase 306 may be used to generate a regular expression 136 which provides sample normalized data 140 back to the operator to confirm the normalization is correct.

In another implementation, the token generation module 114 may be configured to generate regex tokens 118 from existing regular expressions 136. For example, a set of operable regular expressions which were previously manually coded may be used to generate regex tokens 118. The regex tokens 118 may be generated by accessing a previously generated regular expression 136. The regular expression 136 may be decomposed into one or more regex phrases 306. The one or more regex phrases 306 may be extracted to form the at least one or more regex tokens 118.

As described above, the regex token 118 may be associated with one or more of a particular natural language or a particular product category. The item details in the associated input data 108 may correspond to the particular product category and be described at least in part using the particular natural language.

Block 804 provides a user interface 122 configured to receive input from a user. For example, the user interface may comprise a web page made up of one or more markup language documents and provided by the user interface module 110 to the computing device 102.

Block 806 receives, from the user interface 122, input defining a token rule 128. As described above, the token rule 128 may be expressed in a human-readable form having one or more of the token names 302 indicative of one or more of the regex tokens 118 from the token library 116. The token rule 128 may also have a normalized value 402 associated with the token names 302.

The input may be indicative of selection of one or more token names 302 arranged in a particular order relative to one another. The input may also include the normalized value 402 associated with the one or more regex tokens 118.

As described above, the token rule 128 may be associated with one or more of a particular natural language or a particular product category. The item details 206 for the particular product category may be described at least in part using the particular natural language. Selection of the token rules 128 for use may be based on a correspondence between one or more of the natural language data 202, the product category data 204, and so forth, and the input data 108.

Block 808 generates a regular expression 136 using the token rule 128. As described above, the regular expression generation module 132 may use the regex phrases 306 to produce the regular expression 136. The generation may include merging a plurality of the regex phrases 306, removing one or more redundant regex phrases 306, or changing one or more of the regex phrases 306. The changes to the one or more regex phrases 306 may be based at least in part on presence of another regex phrase 306 in the same token rule 128.

Block 810 accesses the input data 108. The input data 108 may include one or more data fields 208 storing strings 210. The strings 210 may include information in one or more natural language phrases. For example "Size Small".

In some implementations, the natural language used in the natural language phrases may be detected. Based on the natural language detected, one or more of the token rules 128 associated with the detected natural language may be selected. In such an implementation, the generating of the regular expression 136 may be based on the selected one or more token rules 128.

Block 812 generates normalized data 140. In one implementation, this generation may include finding the strings 210 in the one or more data fields 208 using the regular expression 136 and replacing them with the normalized value 402. Use of the regular expressions 136 may include processing the regular expressions 136 using a regular expression engine. Other modules may be used to perform the replacement or insertion of the normalized value 402.

Block 814 stores the normalized data 140. The normalized data 140 may replace the input data 108, or may be maintained separately from the input data 108. Once stored, the normalized data 140 may be used by other systems or services.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a nontransitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method comprising:
   accessing, from a storage server, a token library comprising one or more regular expression ("regex") tokens, each of the one or more regex tokens comprising:
   a token name, and
   a regex phrase comprising a sequence of a set of strings including one or more regular characters and one or more metacharacters, the sequence of the set of strings representing equivalent values associated with an attribute;
   providing a user interface configured to receive user input, the user interface comprising one or more markup language documents;
   receiving, from the user interface, the user input to define a token rule, the token rule expressed in a human-readable form and comprising:
   one or more of the token names indicative of one or more of the regex tokens accessed from the token library, the one or more token names corresponding to different regex phrases including the set of strings representing equivalent values associated with the attribute of an item, and
   a normalized value associated with the one or more of the token names, the normalized value representing a predefined string value for describing the attribute of the item that replaces the set of strings representing equivalent values associated with the attribute of the item;
   generating a regex by replacing the one or more token names in the token rule with the regex phrase associated with the regex token that includes a same one or more token names included in the token rule;
   accessing input data comprising one or more data fields storing different string values used to describe the attribute of the item;
   processing the input data to generate normalized data by:
   searching the regex to match the different string values used to describe the attribute of the item provided in the data fields of the input data to a pattern in the regex, and
   replacing the different string values used to describe the attribute of the item provided in the data fields of the input data matching a pattern in the set of strings representing equivalent values associated with the attribute of the item in the regex with the normalized value;
   storing the normalized data for describing the attribute of the item in the storage server;
   receiving, from an end-user by way of a computing device, a request for information about the item;
   providing access to the normalized data to one or more services to provide the requested information about the item to the end-user by way of the computing device;
   retrieving, by the one or more services, the stored normalized data for describing the attribute of the item from the storage server; and
   providing to the end-user the requested information about the item using the normalized data for describing the attribute of the item.

2. The method of claim 1, further comprising:
   generating at least one of the one or more regex tokens by:
   presenting at least a portion of the input data using the user interface,
   receiving second user input indicative of a search pattern within the at least a portion of the input data, and
   processing the second user input using one or more machine learning techniques to generate the regex phrase for the at least one of the one or more regex tokens.

3. The method of claim 1, the generating the regex further comprising one or more of:
   merging a plurality of the regex phrases,
   removing one or more redundant regex phrases, or
   changing one or more of the regex phrases based at least in part on presence of another regex phrase in a same token rule.

4. A computer-implemented method comprising:
   accessing, from a storage server, one or more regular expression ("regex") tokens, each of the one or more regex tokens comprising:
   a token name, and
   a regex phrase comprising a sequence of a set of strings including one or more regular characters or metacharacters, the sequence of the set of strings representing equivalent values associated with an attribute;
   receiving user input, via a user interface, that defines a token rule, the token rule comprising:
   one or more of the token names indicative of the one or more regex tokens, the one or more token names corresponding to different regex phrases including the set of strings representing equivalent values associated with the attribute of an item, and
   a normalized value associated with the token names, the normalized value representing a predefined string value for describing the attribute of the item that replaces the set of strings representing equivalent values associated with the attribute of the item;
   generating one or more regexes for normalizing input data using at least a portion of the token rule by replacing the one or more token names in the token rule with the regex phrase associated with the regex token that includes a same one or more token names included in the token rule;
   accessing the input data comprising one or more data fields storing different string values used to describe the attribute of the item;
   processing the input data to generate normalized data using the one or more regexes to match the different string values used to describe the attribute of the item provided in the data fields of the input data to a pattern in the regex and to replace the different string values used to describe the attribute of the item provided in the data fields of the input data matching a pattern in the set of strings representing equivalent values associated with the attribute of the item in the regex with the normalized value;

receiving, from an end-user by way of a computing device, a request for information about the item;

providing access to the normalized data to one or more services to provide the requested information about the item to the end-user by way of the computing device;

retrieving, by the one or more services, the normalized data describing the attribute of the item; and providing to the end-user the requested information about the item using the normalized data for describing the attribute of the item.

5. The method of claim 4, further comprising:
providing the user interface to the end-user;
receiving second input from the user indicative of a selection of the one or more token names arranged in a particular order relative to one another; and
receiving third input from the user indicative of the normalized value associated with the one or more regex tokens.

6. The method of claim 4, wherein the token rule further comprises one or more attributes associated with the one or more regex tokens, further wherein the one or more attributes are configured to modify operation of the regex phrase of the one or more regex tokens.

7. The method of claim 4, wherein the regex tokens are associated with one or more of a particular natural language or a particular product category; and further wherein item details for the particular product category are described at least in part using the particular natural language.

8. The method of claim 4, further comprising:
detecting a natural language used in one or more natural language phrases, wherein the input data includes the one or more natural language phrases; and
selecting one or more token rules associated with the detected natural language, wherein the generating the one or more regexes is based on the selected one or more token rules.

9. The method of claim 4, wherein the token rule is associated with one or more of a particular natural language or a particular product category; and further wherein item details for the particular product category are described at least in part using the particular natural language.

10. The method of claim 4, further comprising:
generating at least one of the one or more regex tokens by:
accessing a previously generated regex,
decomposing the previously generated regex into one or more of the regex phrases, and
extracting the one or more regex phrases to form the at least one of the one or more regex tokens.

11. The method of claim 4, wherein expression of the token rule conforms to a predefined syntax and grammar and the token name occurs only once within the token rule.

12. The method of claim 4, wherein the token rule is expressed in a human-readable form.

13. A system comprising:
at least one computing device comprising a memory storing computer executable instructions and a processor to execute the instructions to:
generate a library comprising one or more regular expression ("regex") tokens using one or more machine learning techniques, each of the one or more regex tokens comprising:
a token name, and
a regex phrase comprising a sequence of a set of strings including one or more regular characters and one or more metacharacters indicative of a function or input, the sequence of the set of strings representing equivalent values associated with an attribute;
receive user input defining one or more token rules, the one or more token rules comprising:
one or more token names indicative of the one or more regex tokens, the one or more token names corresponding to different regex phrases including the set of strings representing equivalent values associated with the attribute of an item, and
a normalized value associated with the one or more token names, the normalized value representing a predefined string value for describing the attribute of the item that replaces the set of strings representing equivalent values associated with the attribute of the item;
access input data comprising one or more data fields storing different string values used to describe the attribute of the item;
generate a regex for normalizing the input data using at least a portion of the one or more token rules by replacing the one or more token names in the token rule with the regex phrase associated with the regex token that includes a same one or more token names included in the token rule;
using the regex, process the input data to generate normalized data by matching the different string values used to describe the attribute of the item provided in the data fields of the input data to a pattern in the regex and replacing the different string values used to describe the attribute of the item provided in the data fields of the input data matching a pattern in the set of strings representing equivalent values associated with the attribute of the item in the regex with the normalized value; and
receiving, from an end-user by way of the at least one computing device, a request for information about the item;
providing access to the normalized data to one or more services to provide the requested information about the item to the end-user by way of the at least one computing device;
retrieving, by the one or more services, the normalized data describing the attribute of the item; and
providing to the end-user the requested information about the item using the normalized data for describing the attribute of the item.

14. The system of claim 13, the processor further executing the instructions to:
generate a second regex based on the one or more token rules.

15. The system of claim 14, the processor further executing the instructions to:
access the input data comprising the different string values; and
determine the different string values using the regex.

16. The system of claim 14, the processor further executing the instructions to:

access the input data comprising the one or more data fields storing the different string values including one or more natural language phrases in a natural language;

selecting one or more of the token rules associated with the natural language; and wherein the generating the regex is based on the selected one or more token rules.

17. The system of claim 13, the one or more regex tokens further comprising data indicative of one or more natural languages associated with the one or more regex tokens.

18. The system of claim 13, wherein the one or more machine learning techniques are configured to process data comprising a plurality of different portions of strings designated as equivalent to one another.

19. The system of claim 13, the one or more token rules further comprising one or more attribute values, wherein the attribute values specify a fixed value or a range of values associated with the one or more regex tokens.

20. The system of claim 13, wherein the one or more token rules are expressed using a human-readable syntax and grammar, and further wherein the token name occurs only once within a rule.

\* \* \* \* \*

UNITED STATES PATENT AND TRADEMARK OFFICE
CERTIFICATE OF CORRECTION

PATENT NO. : 9,898,467 B1
APPLICATION NO. : 14/035791
DATED : February 20, 2018
INVENTOR(S) : Bradley John Pitzel It is certified that error appears in the above-identified patent and that said Letters Patent is hereby corrected as shown below:

In the Claims

Column 19, Claim 10, Line 55:
"decomposing the previously generated regex into one or more of the regex phrases,"
Should read:
"decomposing the previously generated regex into one or more regex phrases,"

Signed and Sealed this
Seventeenth Day of April, 2018

Andrei Iancu
*Director of the United States Patent and Trademark Office*